United States Patent
Khaleghimeybodi et al.

(10) Patent No.: US 12,526,585 B2
(45) Date of Patent: Jan. 13, 2026

(54) AUDIO SYSTEM THAT USES AN OPTICAL MICROPHONE

(71) Applicant: META PLATFORMS TECHNOLOGIES, LLC, Menlo Park, CA (US)

(72) Inventors: Morteza Khaleghimeybodi, Bothell, WA (US); Antonio John Miller, Woodinville, WA (US); Liliana Ruiz Diaz, Redmond, WA (US); Andrew John Ouderkirk, Redmond, WA (US); Maik Andre Scheller, Redmond, WA (US); Robin Sharma, Redmond, WA (US); Mohamed Tarek Ahmed El-Haddad, Redmond, WA (US); Guohua Wei, Redmond, WA (US); Gizem Tabak, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 340 days.

(21) Appl. No.: 17/525,155

(22) Filed: Nov. 12, 2021

(65) Prior Publication Data

US 2022/0201403 A1    Jun. 23, 2022

Related U.S. Application Data

(60) Provisional application No. 63/126,669, filed on Dec. 17, 2020.

(51) Int. Cl.
*H04R 23/00* (2006.01)
*G01B 9/02* (2022.01)
(Continued)

(52) U.S. Cl.
CPC ....... *H04R 23/008* (2013.01); *G01B 9/02007* (2013.01); *G01B 9/02029* (2013.01);
(Continued)

(58) Field of Classification Search
CPC .......................... H04R 23/008; G01B 9/02007
See application file for complete search history.

(56) References Cited

U.S. PATENT DOCUMENTS

| 5,262,884 A | 11/1993 | Buchholz |
| 6,055,080 A | 4/2000 | Furstenau et al. |

(Continued)

FOREIGN PATENT DOCUMENTS

| CN | 102027536 A | 4/2011 |
| JP | H08265262 A | 10/1996 |

(Continued)

OTHER PUBLICATIONS

Magnani A., et al., "Self-Mixing Vibrometer with Real-Time Digital Signal Elaboration," Applied Optics, vol. 51, No. 21, Jul. 20, 2012, pp. 5318-5325.

(Continued)

*Primary Examiner* — Thomas H Maung
(74) *Attorney, Agent, or Firm* — Greenberg Traurig, LLP

(57) ABSTRACT

An audio system including an optical microphone and an audio controller. The optical microphone includes a light source and a detector. In some embodiments, the light source illuminates skin of a user. Alternatively the optical microphone also includes a membrane, and the light source illuminates a portion of the membrane. Sounds from a local area cause vibrations in the skin (or vibrations in the membrane). The detector may be in an interferometric configuration or a non-interferometric configuration with the light source. The audio controller monitors the vibrations of the skin (or membrane) using signal output from the detector, and measures the sounds using the monitored vibrations.

20 Claims, 9 Drawing Sheets

(51) Int. Cl.
  *G01B 9/02001* (2022.01)
  *G01B 9/02015* (2022.01)
  *G10L 25/03* (2013.01)
  *G10L 25/84* (2013.01)
(52) U.S. Cl.
  CPC ..... *G01B 9/02049* (2013.01); *G01B 9/02083* (2013.01); *G10L 25/03* (2013.01); *G10L 25/84* (2013.01)

(56) References Cited

U.S. PATENT DOCUMENTS

| | | | |
|---|---|---|---|
| 8,813,571 | B2 | 8/2014 | Iwamoto et al. |
| 9,609,439 | B2 | 3/2017 | Agashe et al. |
| 10,362,409 | B1 | 7/2019 | Dewasurendra et al. |
| 10,812,929 | B1 | 10/2020 | Donley et al. |
| 2016/0007125 | A1 | 1/2016 | Lee et al. |
| 2017/0026744 | A1* | 1/2017 | Farzbod ................... H04R 1/46 |
| 2017/0150254 | A1* | 5/2017 | Bakish ................... H04R 3/005 |
| 2017/0351848 | A1 | 12/2017 | Bakish |
| 2018/0232511 | A1 | 8/2018 | Bakish |
| 2023/0375525 | A1* | 11/2023 | Merritt ................... G01J 3/021 |

FOREIGN PATENT DOCUMENTS

| | | |
|---|---|---|
| JP | 2003227749 A | 8/2003 |
| JP | 2005203944 A | 7/2005 |
| JP | 4112505 B2 | 7/2008 |
| JP | 2018536304 A | 12/2018 |
| WO | 2017085571 A1 | 5/2017 |

OTHER PUBLICATIONS

Maruri H.A.C., et al., "V-Speech: Noise-Robust Speech Capturing Glasses using Vibration Sensors," Proceedings of the ACM on Interactive, Mobile, Wearable and Ubiquitous Technologies, Dec. 2018, vol. 2 (4), pp. 1-23.

International Search Report and Written Opinion for International Application No. PCT/US2021/063805, mailed Apr. 8, 2022, 8 pages.

International Preliminary Report on Patentability for International Application No. PCT/US2021/063805, mailed Jun. 29, 2023, 7 pages.

Office Action mailed Aug. 19, 2025 for Japanese Application No. 2023-537149, filed on Dec. 16, 2021, 5 pages.

* cited by examiner

AUDIO SYSTEM THAT USES AN OPTICAL MICROPHONE

CROSS-REFERENCE TO RELATED APPLICATIONS

This application claims the benefit of U.S. Provisional Application No. 63/126,669, filed Dec. 17, 2020, which is incorporated by reference in its entirety.

FIELD OF THE INVENTION

This disclosure relates generally to audio systems, and more specifically to an audio system that uses an optical microphone.

BACKGROUND

In noisy environments (e.g., loud restaurant), it can be difficult for conventional audio systems to selectively capture sound from a target acoustic source (e.g., talker, user's own voice, etc.). The selective capture of sound is affected by whether or not the user is speaking. But in noisy environments, the audio system often cannot distinguish between the user speaking and noise from the environment. Conventional audio systems try to mitigate this using voice activity detectors that rely on the temporal and spectral properties of the wearers voice (e.g., being detected via a conventional microphone) being audible over interfering sounds. But, in low acoustic signal-to-noise ratio (SNR) environments (i.e., a noisy environment) this method often fails as the wearers voice is completely masked by noise.

SUMMARY

An audio system that uses an optical microphone. The audio system includes an audio controller, and may also include a microphone array. In some embodiments, the audio system may be part of a headset, necklace, watch, hearable device, etc. The optical microphone includes a light source and a detector. The light source is configured to emit light. The light includes a reference beam and a sensing beam, and the light source is configured to illuminate skin of the user with the sensing beam. Sounds from the local area (e.g., user's voice, other people, etc.) cause vibrations in the skin of the user. The detector is an interferometric configuration (e.g., self-mixing, low coherence interferometry, etc.) with the light source such that the detector is configured to detect a mixed signal. The mixed signal corresponds to the reference beam that is mixed with a portion of the sensing beam that is reflected by the skin. The audio controller is configured to measure the sounds of the local area using the signal.

In some embodiments a method is described for using an optical microphone that is part of the audio system. Light is emitted from a light source of an optical microphone. The emitted light includes a reference beam and a sensing beam. Sounds from the local area (e.g., user's voice, other people, etc.) cause vibrations in the skin of the user. The skin (e.g., portions of the face) of a user is illuminated with the sensing beam. A detector in an interferometric configuration with the light source detects a mixed signal. The mixed signal corresponds to the reference beam that is mixed with a portion of the sensing beam that is reflected by the skin. The sounds are measured using the mixed signal.

In some embodiments, a non-transitory computer readable medium configured to store program code instructions is described. The instructions when executed by a processor of an audio system, cause the audio system to perform steps of the method described above and/or other methods described herein.

In some embodiments, the detector and the light source are not in an interferometric configuration, and the optical microphone measures the sounds of the local based on intensity modulation (non-interferometric) of light reflected and/or scattered from the skin.

Note in some embodiments, the optical microphone also includes a membrane, and instead of illuminating the skin, the light source illuminates a portion of the membrane and/or diaphragm with the sensing beam (or more generally light from the light source). In these embodiments, sounds from the local area causes the membrane to vibrate. As such, the optical microphone measures the sound in the local area by monitoring vibrations of the membrane caused by sounds from the local area. In this embodiment, the light source and the detector may be in an interferometric or non-interferometric configuration.

Figure 1A:
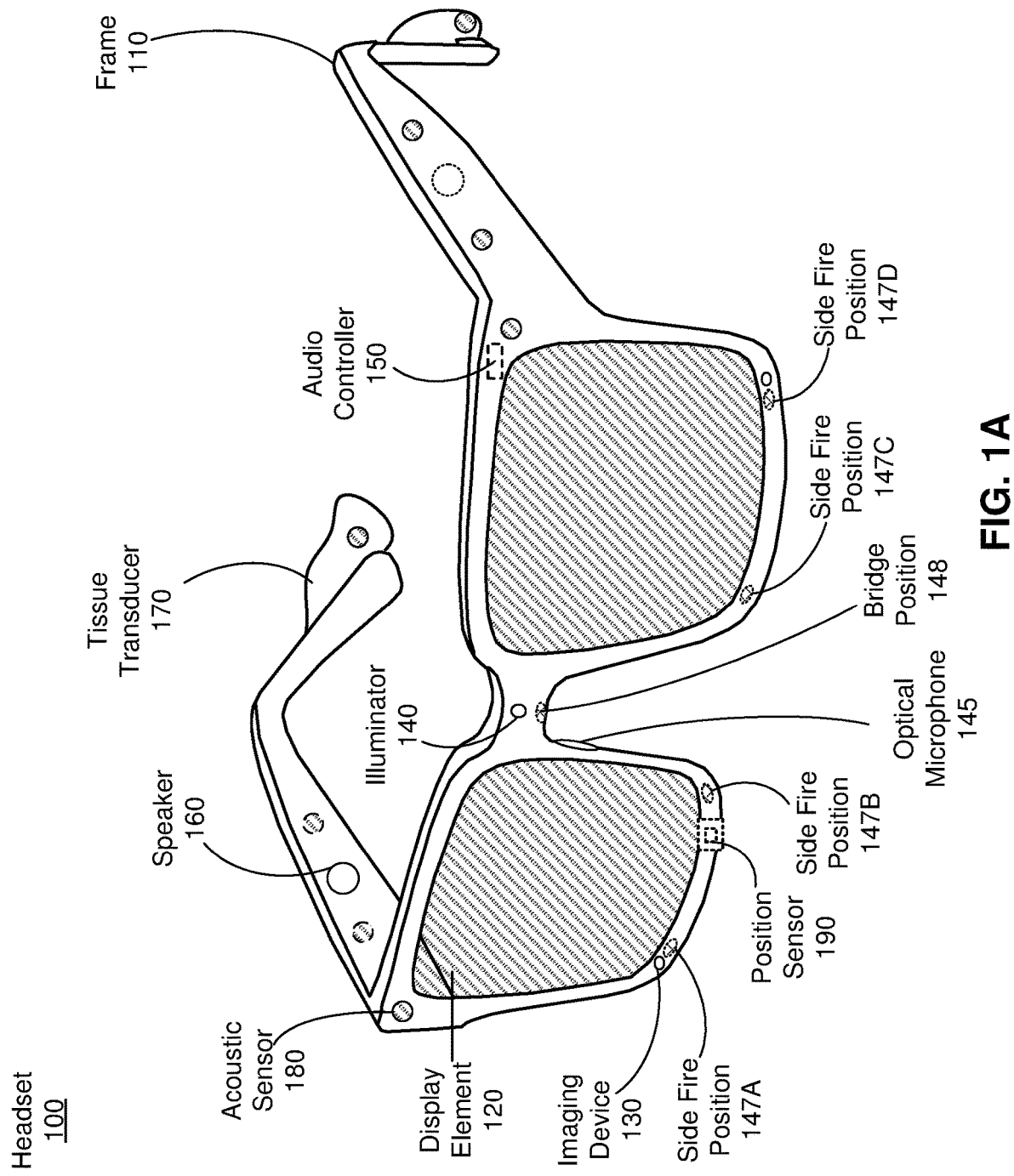
FIG. 1A is a perspective view of a headset implemented as an eyewear device that includes at least one optical microphone, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system includes one or more optical microphones and an audio controller. In some embodiments, the audio system is part of a headset, and the one or more optical microphones are positioned to monitor vibrations of skin on a user of the headset caused by sounds (e.g., user's voice, other people, noise sources, etc.) in a local area of the headset. The one or more optical microphones may be positioned on one or more locations (e.g., nose pad, frame, etc.) on the headset. The audio system can use the monitored vibrations to measure sounds in the local area and perform various actions (e.g., active noise cancellation, user voice enhancement, function as a voice activity detection, etc.) based on the measured sound. Note that while the above is in the context of the one or more optical microphones being located on a headset. In other embodiments, the one or more optical microphones and/or the audio system may be on other devices (e.g., necklace, smart watch, etc.).

The optical microphone monitors vibrations of the skin of the user. The optical microphone includes a light source and a detector. The light source (e.g., vertical cavity surface emitting laser—VCSEL) is configured to emit light. The optical band of the emitted light is such that skin predominately reflects the light (versus, e.g., predominately absorb it, between 250 to 1800 nm). In some embodiments, the emitted light is continuous wave, and includes a reference beam and a sensing beam. Sounds from a local area of the audio system cause vibrations in the skin of the user. The light source is configured to illuminate the skin (e.g., portions of the face) of the user with the sensing beam.

The detector is in an interferometric configuration with the light source such that the detector is configured to detect a mixed signal. In an interferometric configuration, the optical microphone becomes an interferometer-based system where constructive or destructive interference between light from the laser and the reflected light provides a signal that changes as function of varying distance. For example, a wavelength of 850 nm may provide accuracy down to the 10 nm range or below. The interferometric configuration is such that the light source and detector form an interferometric system (e.g., self-mixing interferometer, a Michelson interferometer, low coherence interferometry (LCI), laser doppler vibrometer (LDV), etc.). The mixed signal corresponds to the reference beam that is mixed with a portion of the sensing beam that is reflected by the skin.

The audio controller processes information from the detector. The audio controller is configured to measure the sounds using the mixed signal. The audio controller analyzes the mixed signal to measure some or all of the sounds that cause the vibrations in the skin of the user. The sounds may include, e.g., a voice of the user and/or other sound sources within the local area (e.g., other people, noise sources (e.g., fan), etc.).

In some embodiments, the audio system may also include a microphone array. The microphone array is configured to detect sounds from the local area. The sounds from the local area may include, e.g., a voice of a user of the audio system, sounds from other sound sources in the local area, or some combination thereof.

The audio system may perform various actions based in part on sounds measured by the one or more optical microphones, the sounds detected by the microphone array, or some combination thereof. Actions may include, e.g., enhancing a user's voice, using one or more of the optical microphones for voice activity detection (VAD), performing active noise cancelation, capturing information for identifying micro expressions of the user, monitoring position of the headset, etc. Note in some embodiments, some or all of each optical microphone may be coupled to a vibrational damping structure that is coupled to the headset. The vibrational damping structures mitigate vibrations from the headset (or more generally device to which the optical microphone is coupled) being passed to the optical microphones.

Note in some embodiments, instead of monitoring vibration of skin of the user, the optical includes a membrane and monitors sounds from the local area by monitoring vibrations of the membrane. Sounds from the local area causes the membrane to vibrate. In this embodiment, the light source is configured to illuminate a portion of the membrane, and the membrane scatters and/or reflects some of the light. The light source and the detector may be in an interferometric or non-interferometric configuration. The detector detects the scattered and/or reflected light. The audio controller uses the signals from the detector to measure sounds from the local area.

Conventional VADs do not function well in low acoustic SNR environments (e.g., a crowded restaurant that is noisy). These systems detect sound from the local area using a microphone and then try to isolate the user's voice from within the low acoustic SNR environment. But, in low acoustic SNR environments this method often fails as the wearers voice is completely masked by other sounds (e.g., other people speaking in the crowded restaurant). In contrast, the audio system described herein uses one or more contact optical microphones to monitor vibrations on the skin of the user, and uses these vibrations to measure sound. The noise in the detected signal is much lower than conventional signals, and it allows for reliable identification of when a user is speaking. Moreover, as only relative distance changes are observed in an interferometric system, for embodiments where the detector is in an interferometric configuration with the light source no calibration of the absolute distance or alignment is required in case of distance changes (e.g. moving glasses). Additionally, conventional VADs (e.g., bone conduction microphones with a vibrating membrane) have a resonant frequency, and using them around and above the resonant frequency can be difficult and not-accurate. In contrast, the optical microphone does not have a moving or vibrating element as such the aforementioned limitation in conventional VADs is not an issue for the optical contact microphone.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, one or more optical microphones 145, and an audio controller 150. However, in other embodiments, the audio system may include different and/or additional components. Similarly, in some cases, functionality described with reference to the components of the audio system can be distributed among the components in a different manner than is described here. For example, some or all of the functions of the audio controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

In some embodiments, the one or more optical microphones 145 detect tissue-based vibrations of the skin resulting from sounds in the local area. The sounds may include, e.g., speech of the user, and sounds from other sounds sources in the local area. For example, when the user speaks, a portion of the speech actually transmits through tissue of the user via tissue conduction. This portion of speech manifests on the skin of the user's head as slight tissue based vibrations. The one or more optical microphones 145 detect these tissue based vibrations. Likewise, sound sources (e.g., fans, other speakers, etc.) external to the user produce sounds that also may manifest as vibrations on the skin of the user. An optical microphone 145 includes at least one light source and at least one detector, and may optionally include one or more optical elements. The optical microphone 145 may be configured in a variety of ways. For example, the light source and the detector may be configured in a serial or a parallel configuration (e.g., as described below with regard to FIGS. 5A and 5B). And in some instances the optical microphone may be a paired optical microphone including at least two self-mixing interferometers (e.g., as described below with regard to FIG. 5C). And in some instances, the light source and the detector of an optical microphone may be located in different locations on the headset 100 (e.g., different positions within a nose pad, on the frame 110, etc.). The detector and the light source may be located on different or same dies, depending on, e.g., whether they are double path or common path interferometers, in such case a threshold distance between them is determined by interferometer arm length The light source is configured to emit light. The light source may be, e.g., a vertical cavity surface emitting laser (VCSEL), an edge emitting laser, a tunable laser, some other coherent light source, or some combination thereof. The optical band of the emitted light is such that skin predominately reflects the light (versus, e.g., predominately absorb it). The one or more optical microphones 145 may emit light at, e.g., 850 nm, 940 nm, 1300 nm, 1050 nm, etc. The emitted light is continuous wave, and in some embodiments, includes a reference beam and a sensing beam. In some embodiments, the light source is configured to illuminate the skin (e.g., one or more same or different portions of the face) of the user (e.g., with the sensing beam).

The detector monitors light in the band of light emitted by the light source. The detector may be, e.g., one or more photodetectors. In some embodiments, the detector and the light source are configured to form an interferometric system (e.g., self-mixing interferometer, a Michelson interferometer, LCI (e.g., optical coherence tomography), LDV, etc.). Accordingly, the detector is configured to detect a mixed signal that corresponds to the reference beam that is mixed with a portion of the sensing beam that is reflected by the skin (e.g., via Fresnel and/or scattering reflections). In other embodiments, the light source and the detector are in a non-interferometric configuration. In this configuration the detector measures modulation of the intensity of the reflected and/or scattered light from the skin.

In alternate embodiments, the optical microphone 145 includes a membrane and instead of monitoring vibration of skin of the user, monitors vibrations of the membrane. In this embodiment, the light source is configured to illuminate a portion of the membrane, and the membrane scatters and/or reflects some of the light. In some embodiments, at least the portion of the membrane illuminated by the light source is highly reflective in the band of light emitted by the light source. The light source and the detector may be in an interferometric or non-interferometric configuration. The detector detects the scattered and/or reflected light from the membrane, signals output (e.g., mixed signal, modulated intensity) may be used to monitor the sounds in the local area.

In the example shown in FIG. 1A, the optical microphone 145 is located in an area of the frame 110 that would be in contact with a portion of a nose of a user wearing the headset 100. For example, the optical microphone 145 could be integrated into one or both nose pads of a set of glasses. In other embodiments, one or more of the optical microphones 145 may be located alternatively or additionally elsewhere on the headset 100 and/or there may be one or more additional optical microphones 145 on the headset 100. For example, some or all of the one or more optical microphones 145 could be positioned on an inward facing side of the frame 110 at some or all of side fire positions 147A, 147B, 147C, 147D and/or a bridge position 148. Various embodiments of the optical microphone 145 are described below with regard to FIGS. 2, 3, 4, and 5A-C.

The audio controller 150 processes the detected one or more mixed signals from the detectors of the one or more optical microphones 145 to measure the sounds from the local area. The audio controller 150 may analyze the mixed signal from some or all of the respective optical microphone 145 to measure some or all of the sounds that cause the vibrations in the skin of the user. The sounds may include, e.g., a voice of the user and/or other sound sources within the local area (e.g., other people, noise sources (e.g., fan), etc.).

The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the transducer array, instruct the transducer array to perform active noise cancellation, identify a voice of the user, identify and execute commands based on the identified voice of the user, capture information that could be used to identify micro expressions of the user, or some combination thereof. Additional details regarding how the audio controller 150 may use the detected tissue vibrations are described in detail with regard to the figures discussed below.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that detect images of some or all of the local area. In some embodiments, some or all of the imaging devices 130 of the DCA may also function as the PCA. The images detected by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 4.

Figure 1B:
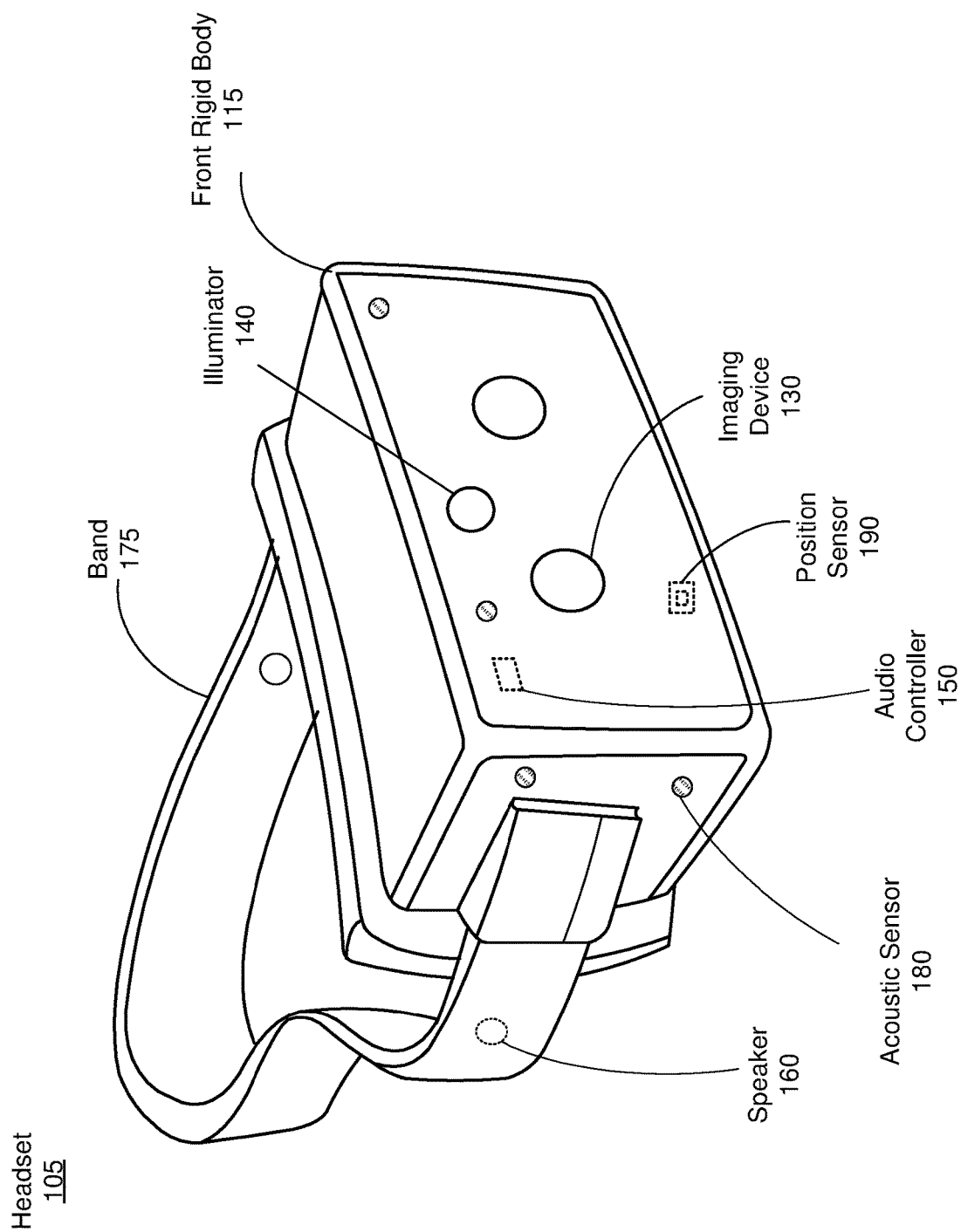
FIG. 1B is a perspective view of a headset implemented as a head-mounted display that includes at least one optical microphone, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system (that includes one or more optical microphones 145), and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
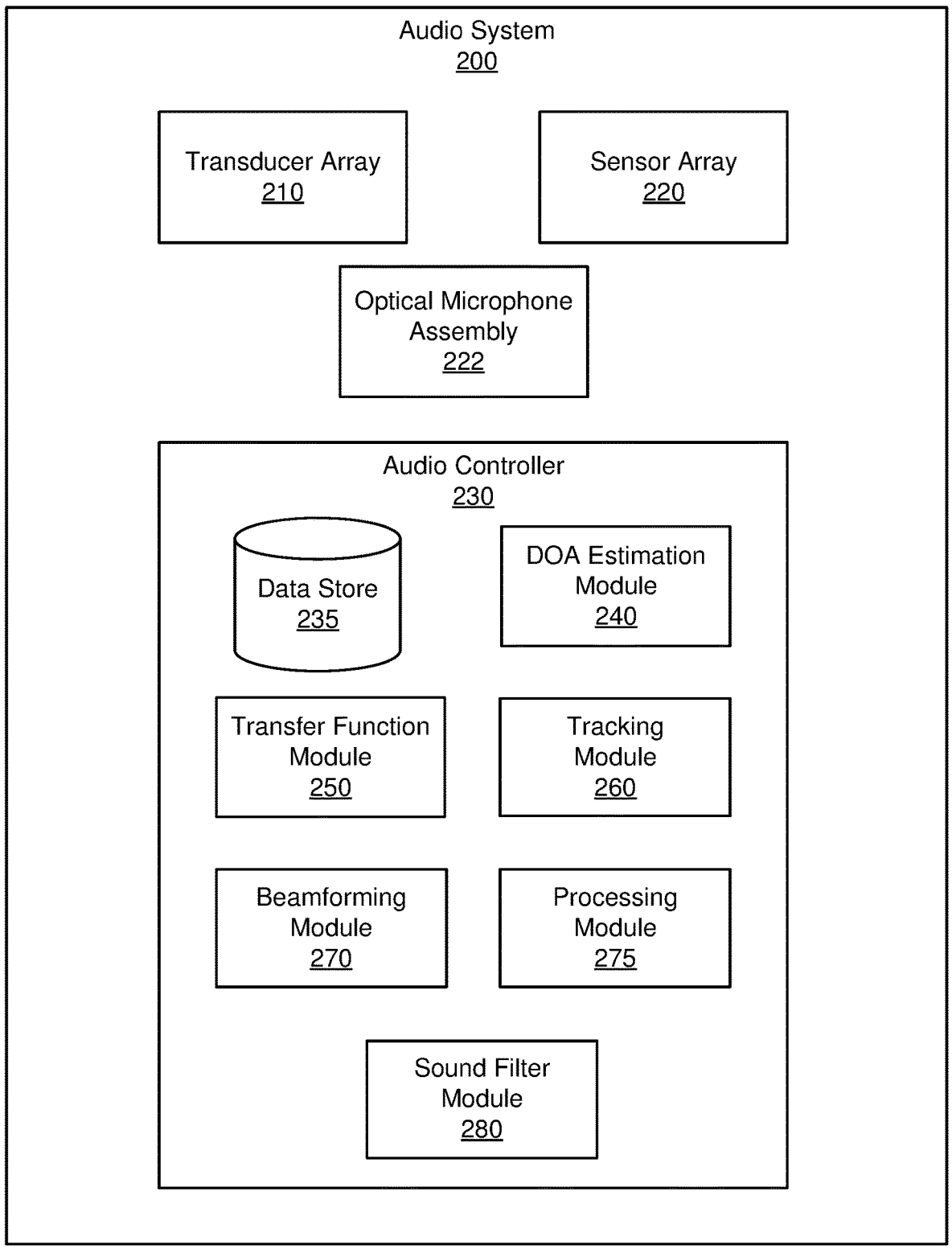
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, optical microphone assembly 222, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The detected sounds may be, e.g., from the user of the audio system 200 (e.g., the user's voice) and/or sounds from other sound sources (e.g., other people) in the local area. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

In some embodiments, the optical microphone assembly 222 is configured to detect tissue based (i.e., temporal) vibrations of the skin resulting from sounds in the local area. The optical microphone assembly 222 includes one or more of the optical microphones 145. As described above with regard to FIG. 1A, the optical microphone 145 includes at least one light source and at least one detector, and may optionally include one or more optical elements (e.g., lenses). An optical microphone 145 may be configured in a variety of ways (e.g., as described below with regard to FIGS. 3-5C). Signals output (e.g., mixed signal, modulated intensity) from each optical microphone 145 may be used to monitor the sounds in the local area.

Note in some embodiments, the one or more optical microphones 145 include each include a membrane, and instead of monitoring vibration of skin of the user, monitor vibrations of the membrane. In this embodiment, the light source is configured to illuminate a portion of the membrane, and the membrane scatters and/or reflects some of the light. In some embodiments, at least the portion of the membrane illuminated by the light source is highly reflective. The light source and the detector may be in an interferometric or non-interferometric configuration. The detector detects the scattered and/or reflected light from the membrane, signals output (e.g., mixed signal, modulated intensity) may be used to monitor the sounds in the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a processing module 275, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data detected by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, tissue vibrations detected by the one or more optical microphones 145, sounds detected by the sensor array 220, a model that maps light amplitude to distance from a detector of the optical microphone 145, and other data relevant for use by the audio system 200, or any combination thereof.

The user may opt-in to allow the data store 235 to record data detected by the sensor array 220 and/or the one or more optical microphones 145. In some embodiments, the audio system 200 may employ always on recording, in which the audio system 200 records all sounds detected by the sensor array 220 and/or the optical microphone assembly 222. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas thereby functioning as an adaptive beamformer. In analyzing sounds detected by the sensor array 220 and in some cases the optical microphone 145, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The processing module 275 measures the sounds in the local area using the output signals from the optical microphone assembly 222. The output signals may be, e.g., a signal corresponding to an amplitude of a portion of the light reflected from the skin. For example, the audio controller may input the detected light into a model that maps light amplitude to distance from the detector (i.e., skin position). This is further discussed below with regard to FIG. 3.

In cases where the one or more optical microphones 145 are in an interferometric configuration, the output signals may be, e.g., a mixed signal. The detected mixed signal includes a dynamic high frequency component and the modulation component. The dynamic high frequency component changes (shifts in frequency) as a function of distance between the illuminated portion of the skin and the detector. Note that the amplitude of vibrations measured may be, e.g., 50 nm (e.g., user whispering) to 1.5 microns (e.g., user yelling, some other loud noise in the local area). Accordingly, vibrations in the skin caused by sound in the local area result in changes in the dynamic high frequency component. The processing module measures the sound by inferring from the dynamic high frequency component a corresponding sound that would have caused the vibration of the user's skin. Moreover, as the vibrations of the user's skin caused by sound are at much different frequencies than, e.g., vibrations caused by motion of the user (e.g., walking, running)—referred to as motion noise. The processing module 275 may isolate and/or filter out portions of the dynamic high frequency component corresponding to motion noise.

Note that magnitudes of speech-driven tissue vibration decrease at higher audio frequencies. This can be due to the low-pass nature of the bone-conducted speech when the speech-driven vibrations propagating through the bones and soft tissues. This anatomical low-pass filter feature can affect how well the optical microphone can sense speech content information at higher frequencies. As such, in some instances a high frequency component of a voice (e.g., of the user) may be attenuated. The high frequency component may be, e.g., audio content with frequencies over 2 kHz.

The processing module 275 may augment and/or reconstruct sensed speech content (e.g., for higher frequencies). The processing module 275 may for example, reconstruct high frequency content of the sensed speech using a matrix-factorization-based bandwidth expansion method. Clean speech recordings obtained using one or more acoustic microphones are used to learn broadband spectral bases for the user. These broadband bases include both low and high frequency content of the speech. Their low frequency content is then used on narrowband speech (obtained with the optical microphone) to learn how the broadband bases should be combined to obtain broadband speech.

In another embodiment, the processing module 275 may use neural-network based audio super-resolution methods to reconstruct high frequency content. If the network is trained in spectral domain, audio super-resolution enables extrapolating (inpainting) high frequency content from the low-frequency content. If the network is trained in time-domain, it interpolates the narrowband waveform in time domain to obtain broadband speech with high frequency content. Alternatively, it is also possible to jointly train two networks, one in time domain and the other in frequency domain. The outcome of two networks could be combined with a fusion layer, or two networks could be cascaded. Simultaneous recordings of one or more optical microphones and acoustic microphones can be used in training of these neural networks. The learned networks then can be used to reconstruct high frequency content of speech obtained with one or more optical microphones.

Note that similar methods have successfully been used in literature to reconstruct broadband speech from narrowband telephone signals. In the telephone application, low frequency contents of the narrowband and broadband speech are the same. However, low frequency content of speech captured with optical microphone can be different from the one captured with acoustic microphone. To account for this difference, a weighting matrix that maps the bases obtained from optical microphone to acoustic microphone can be included in the factorization-based methods. This matrix can be learned during training. When training audio super-resolution networks, one or more convolutional layers can be inserted as the input layer(s). With proper training, the additional layer(s) can help learn the mapping of low frequency contents of optical microphone to acoustic microphone.

The processing module 275 may update the measured sounds of the voice with the reconstructed high frequency component. The reconstructed high frequency component mitigates the attenuation of the high frequency component.

The processing module 275 may identify the voice of the user in the detected sounds using the signals output (e.g., mixed signals) from the optical microphone assembly 222. The output signals are vibrations that occur on the skin of the user when, e.g., the user speaks and/or sound from the local area causes the skin to vibrate. In some embodiments, the one or more optical microphones 145 may function as a VAD. As such, the processing module 275 can input the output signals from the one or more optical microphone assembly 222 and the sounds from the local area into a model which uses the inputs to identify the voice of the user in the detected sounds from the local area.

In some embodiments, processing module 275 may determine that the identified voice of the user includes a command. And the audio system 200 and/or the headset 100 may then perform an action in accordance with the command. The action may control some operation of the audio system 200 and/or the headset 100. An action may, e.g., designate a sound source, decrease/increase volume, some other action that controls an operation of the audio system 200 and/or the headset 100 or some combination thereof.

The processing module 275 uses the detected tissue vibrations (i.e., output signal) from the optical microphone assembly 222 and the detected sounds from the sensor array 220 in a number of ways. In some embodiments, the processing module 275 calibrates the one or more optical microphones 145 using sounds detected from the sensor array 220.

In some embodiments, the processing module 275 identifies one or more sounds for suppression (e.g., background noise) in the measured sounds from the optical microphone 145 and/or the sensor array 220. The processing module 275 can then provide this information to the sound filter module 280 as part of an active noise cancellation process. The sound filter may be applied to modify an audio signal that corresponds to audio content. And the transducer array 210 may then present the modified audio signal to the user as modified audio content, the modified audio content including the audio content and a suppression component that suppress the noise.

In some embodiments, the processing module 275 may use the output signals from the optical microphone assembly 222 to monitor slippage of the headset on the head of the user. For example, if the headset moves to a new resting position on the head of the user, it would introduce an offset in distance. The processing module 275 may identify the offset in the output signals to identify and/or monitor the position of the headset on the user. The new positional information may be used by, e.g., the sound filter module 280 to generate more accurate sound filters.

The sound filter module 280 determines sound filters for the transducer array 210. In some embodiments, the sound filters cause the audio content to be spatialized, such that the audio content appears to originate from a target region. In some embodiments, the sound filters may cause positive or negative amplification of sounds as a function of frequency. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 9).

The sound filter module 280 may update one or more sound filters based on the identified voice of the user in the detected sounds. The one or more updated sound filters may be applied to audio content to generate modified audio content. For example, the sound filter module 280 may update a sound filter such that as applied to the audio content, the modified audio content would enhance the identified voice of the user. In some embodiments, the sound filter module 280 may update a sound filter to suppress one or more sounds detected by the one or more optical microphones 145 and/or the sensor array 220 (i.e., perform active noise cancellation). In some embodiments, the sound filter module 280 provides the sound filters and/or modified audio content to the transducer array 210 and/or one or more other audio systems in the local area. The sound filter module 280 may provide the one or more updated sound filters and/or modified audio content to the one or more other audio systems via, e.g., a local wireless network (e.g., WIFI, BLUETOOTH, etc.) In this manner, the voice of the user may be presented to the user of the other audio system in real time—which can be particularly helpful in a noisy environment (e.g., in a crowd at a football game or some other low acoustic SNR environment) where that other user would have difficulty hearing the user's voice.

Figure 3:
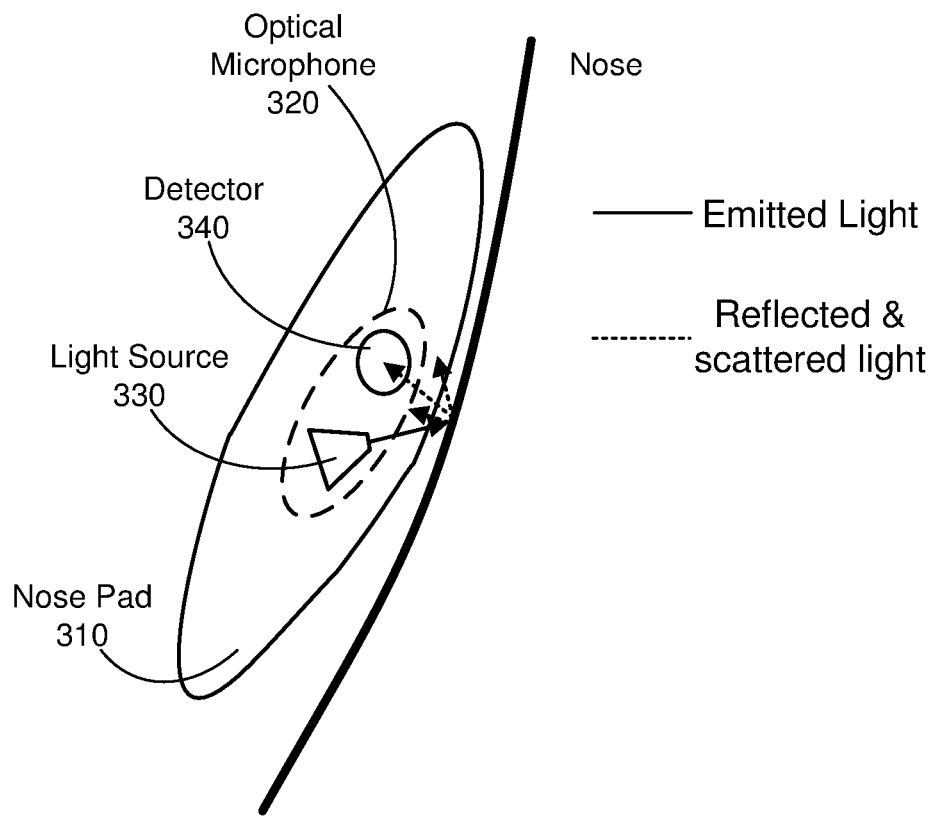
FIG. 3 is an example nose pad that includes an optical microphone having a light source and a detector located in different locations within the nose pad, according to one or more embodiments.

FIG. 3 is an example nose pad 310 that includes an optical microphone 320 having a light source 330 and a detector 340 located in different locations within the nose pad 310, according to one or more embodiments. The nose pad 310 is an example nose pad of a headset (e.g., the headset 100). The optical microphone 320 is an embodiment of the optical microphone 145, where the lights source 330 and the detector 340 are located in different positions within the nose pad 310 and are separated from each other by a threshold distance. The detector 340 and the light source 330 are located on different or same dies, depending whether they are double path or common path interferometers, in such case the threshold distance is determined by interferometer arm length. As illustrated in FIG. 3, the light source 330 illuminates a portion of the nose with light. And the detector 340 detects some of the light that is scattered and reflected by the nose.

Vibration in the skin may affect how much light of the emitted light is reflected and/or scattered from the skin of the user. In some embodiments, an audio controller processes the detected light to measure sounds from the local area based on the modulated intensity of the detected light. For example, the audio controller may input the detected light into a model that maps light amplitude to distance from the detector 340 (i.e., skin position). For example, at a first time the detected light may have a relatively low amplitude signal, and at a second time the detected light may have an increased amplitude signal. As such, the skin would be farther away during the first time than the second time. In this manner, the audio controller can monitor vibrations of the skin using the amplitude of the detected signals.

In some embodiments, light emitted from the light source 330 is divided into a reference beam and a sensing beam. The reference beam is provided to the detector 340. In these embodiments, the detector 340 is in an interferometric configuration with the light source 330 such that the detector 340 is configured to detect a mixed signal. For example, there may be an optical wave guide (e.g., fiber) that provides the reference beam to the detector 340. The reference beam would mix with the portion of the sensing beam reflected and scattered from the nose to create a mixed beam which is detected by the detector as a mixed signal. The audio controller processes the detected mixed signal to measure the sounds from the local area.

Figure 4:
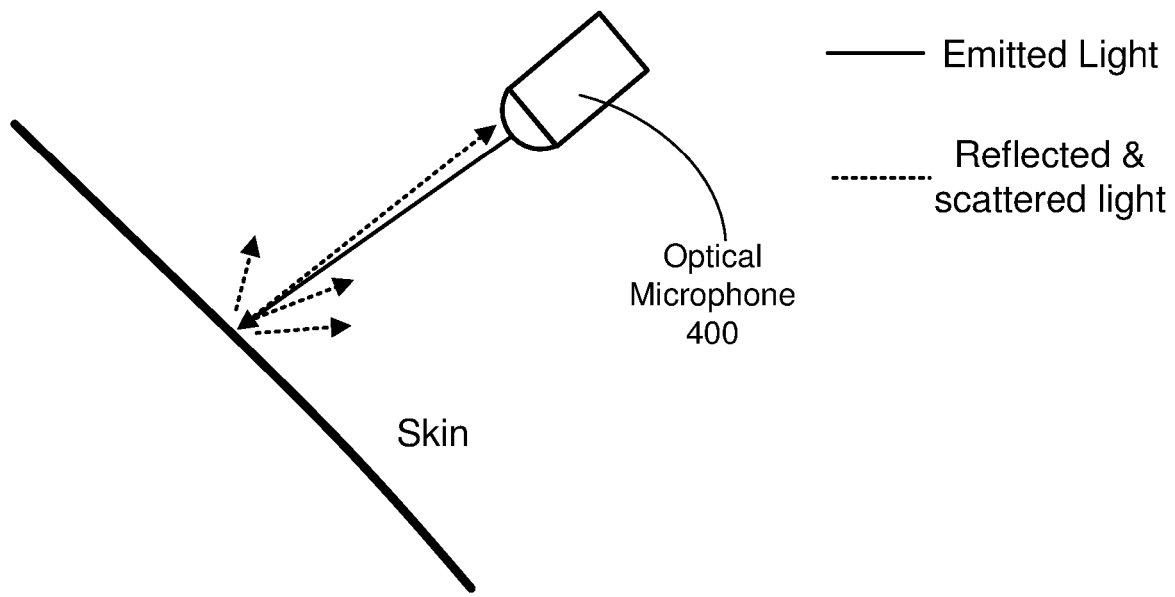
FIG. 4 is an example optical microphone that is configured as a self-mixing interferometer, according to one or more embodiments.

FIG. 4 is an example optical microphone 400 that is configured as a self-mixing interferometer, according to one or more embodiments. The optical microphone 400 includes a light source (not shown), a detector (not shown), and an optical element. The optical microphone 400 is an embodiment of the optical microphone 145, where the lights source and the detector are part of the same device and configured to function as configured as a self-mixing interferometer. The optical microphone 400 may, e.g., be embedded in a nose pad of a headset, coupled to a frame of the headset (e.g., in a side fire position), etc. Various embodiments of the optical microphone 400 are detailed below with regard to FIGS. 5A, 5B, and 5C.

The optical microphone 400 is configured as a self-mixing interferometer. A system based on self-mixing-interferometry is one where the reflected light is fed back in the laser cavity which modulates the laser's power and the laser cavity acts as lock-in amplifier, increasing microphone SNR. In a self-mixing interferometer system, a detector (e.g., photodiode) may be placed on the laser die laterally or vertically displaced to measure the laser intensity. In some embodiments, the light source divides the emitted light into a reference beam and a sensing beam and provides the reference beam to the detector. Additionally, or alternatively, a portion of the light emitted from the light source may be reflected by the optical element back towards the detector, and the portion of reflected light is the reference beam. The detector is in an interferometric configuration (to act as a self-mixing interferometer) with the light source, and is configured to detect a mixed signal. The mixed signal corresponding to a mixed beam formed from the reference beam mixing with a portion of the sensing beam that was reflected and scattered from the nose. The audio controller processes the detected mixed signal to measure the sounds from the local area.

Figure 5A:
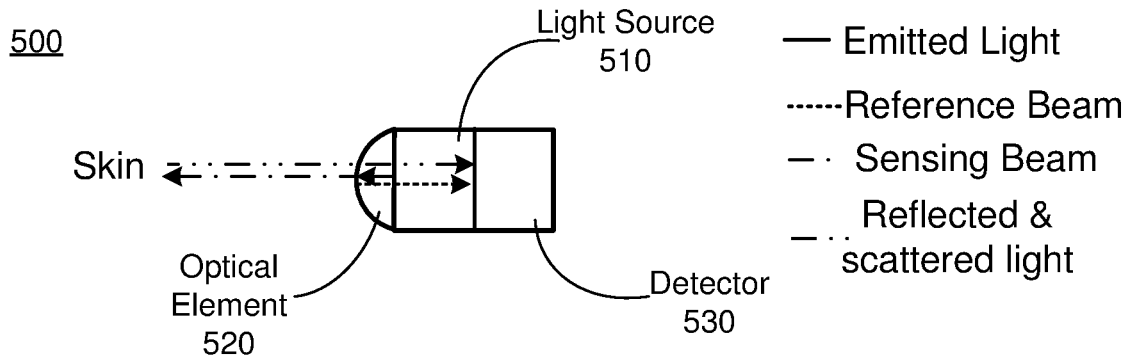
FIG. 5A is an optical microphone that is configured as a self-mixing interferometer with its components in a serial configuration, according to one or more embodiments.

FIG. 5A is an optical microphone 500 that is configured as a self-mixing interferometer with its components in a serial configuration, according to one or more embodiments. The optical microphone 500 includes a light source 510, an optical element 520, and a detector 530. In some embodiments, the light source 510 and the detector 530 are coupled to the same die. The optical microphone 500 is an embodiment of the optical microphone 400.

As illustrated the light source 510 (e.g., VCSEL) emits light. The emitted light is incident on the optical element 520 (e.g., a lens), and portion of the emitted light is transmitted by the optical element 520 as a sensing beam, and a portion of the emitted light is reflected towards the detector 530 as a reference beam. Note in some embodiments (not shown), the light source 510 may emit light both towards the optical element as the sensing beam and towards the detector 530 as the reference beam. A portion of the sensing beam scatters and/or reflects from the skin of the user and then passes through the optical element 520 and the light source 510 to mix with the reference beam at the detector 530 to form a mixed beam. The detector 530 detects this mixed beam as a mixed signal. An audio controller processes the detected mixed signal to measure the sounds from the local area.

Figure 5B:
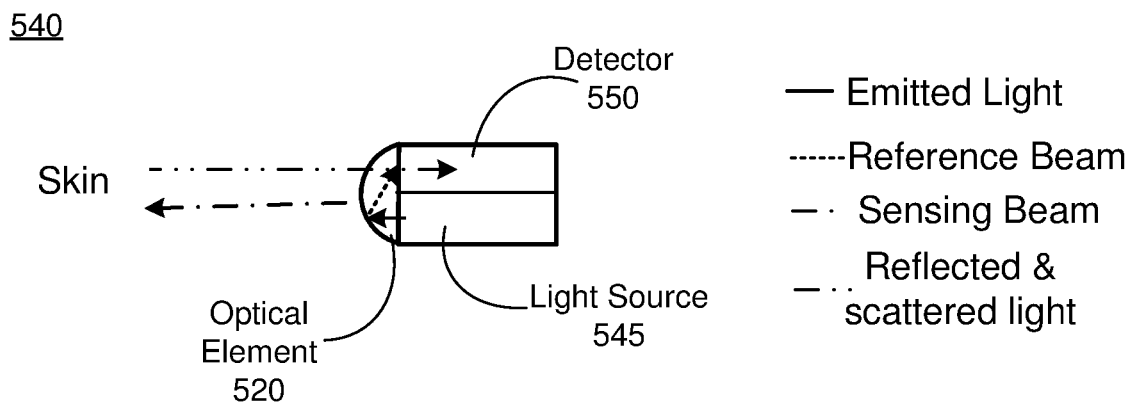
FIG. 5B is an optical microphone that is configured as a self-mixing interferometer with its components in a parallel configuration, according to one or more embodiments.

FIG. 5B is an optical microphone 540 that is configured as a self-mixing interferometer with its components in a parallel configuration, according to one or more embodiments. The optical microphone 540 includes a light source 545, the optical element 520, and a detector 550. In some embodiments, the light source 510 and the detector 530 are coupled to the same die. The light source 545 and the detector 550 are substantially the same as the light source 510 and the detector 530 except they are laid out in a parallel configuration, and the detector 550 is now also coupled to the optical element 520. The optical microphone 500 is an embodiment of the optical microphone 400.

As illustrated the light source 545 (e.g., VCSEL) emits light. The emitted light is incident on the optical element 520 (e.g. a lens), and portion of the emitted light is transmitted by the optical element 520 as a sensing beam, and a portion of the emitted light is reflected towards the detector 550 as a reference beam. A portion of the sensing beam scatters and/or reflects from the skin of the user and then passes through the optical element 520 to mix with the reference beam at the detector 550 to form a mixed beam. The detector 550 detects this mixed beam as a mixed signal. An audio controller processes the detected mixed signal to measure the sounds from the local area.

Figure 5C:
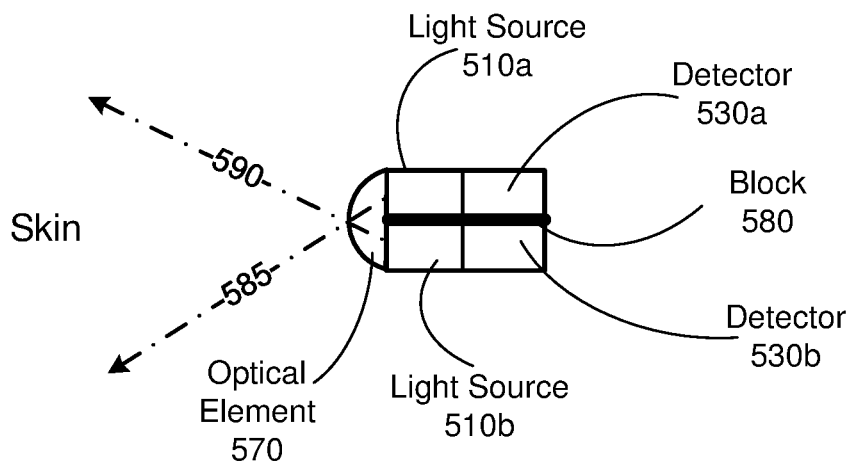
FIG. 5C is an example of a paired optical microphone including two self-mixing interferometers, according to one or more environments.

FIG. 5C is an example of a paired optical microphone 560 including two self-mixing interferometers, according to one or more environments. The optical microphone 560 includes a light source 510a, a light source 510b, an optical element 570, a detector 530a, a detector 530b, and a block 580. In some embodiments, the light source 510a, the light source 510b, the detector 530a, the detector 530b, and the block 580 are coupled to the same die. The light source 510a and 510b are substantially the same as the light source 510, the detector 530a and the detector 530b are substantially the same as the detector 530. The optical element 570 is substantially the same as the optical element 520 except that it is coupled to a plurality of light sources. The optical microphone 560 is an embodiment of the optical microphone 400.

A paired optical microphone 560 includes one or more optical elements, a plurality of light sources and a plurality of corresponding detectors. And each light source is either in a parallel or a serial configuration with its corresponding detector to form a respective optical microphone. For example, as illustrated, the light source 510*a* is in a serial configuration with the corresponding detector 530*a*, and the light source 510*b* is in a serial configuration with the corresponding detector 530*b*. In some embodiments, the light source 510*a* and the light source 510*b* emit at the same wavelength. In alternate embodiments, the light source 510*a* and the light source 510*b* emit at different wavelengths. For example, the light source 510*a* may emit light at 780 nm, and the light source 510*b* emit light at 850 nm. Accordingly, the light source 510*a*, detector 520*a*, and optical element 570 form a first optical microphone that is configured as a self-mixing interferometer with its components in a serial configuration (e.g., as shown in FIG. 5A); and the light source 510*b*, detector 520*b*, and optical element 570 form a second optical microphone that is configured as a self-mixing interferometer with its components in a serial configuration. Note that while two optical microphones are showed in the illustrated example, in other embodiments, there may be additional optical microphones formed that also are coupled to the optical element 570.

Cross talk is mitigated between the two optical microphones via the block 580. The block 580 is made out of a material that does not transmit light (e.g., absorptive or reflective) emitted by the light sources 510*a*, 510*b*. In some embodiments the block 580 may be part of a semiconductor die to form a single chip with the emitter. In some embodiments, the block 580 is a metal used to bond tow individual chips together. Note that different positioning of the two optical elements relative to the optical element 570 allows each of the optical microphones to have different emission angles. For example, the optical microphone formed using the light source 510*a* and the detector 530*a* emits a sensing beam 585, and the optical microphone formed using the light source 510*a* and the detector 530*a* emits a sensing beam 590. And the sensing beams 585 and 590 are emitted from the optical element 570 at different angles.

The paired optical microphone 560 may monitor two different locations at the same time. In contrast the optical microphones 500, 540 monitor a single location. Note that the optical microphone 540 may be easier to realize using packaging techniques of two elements rather than full wafer processing.

Figure 6:
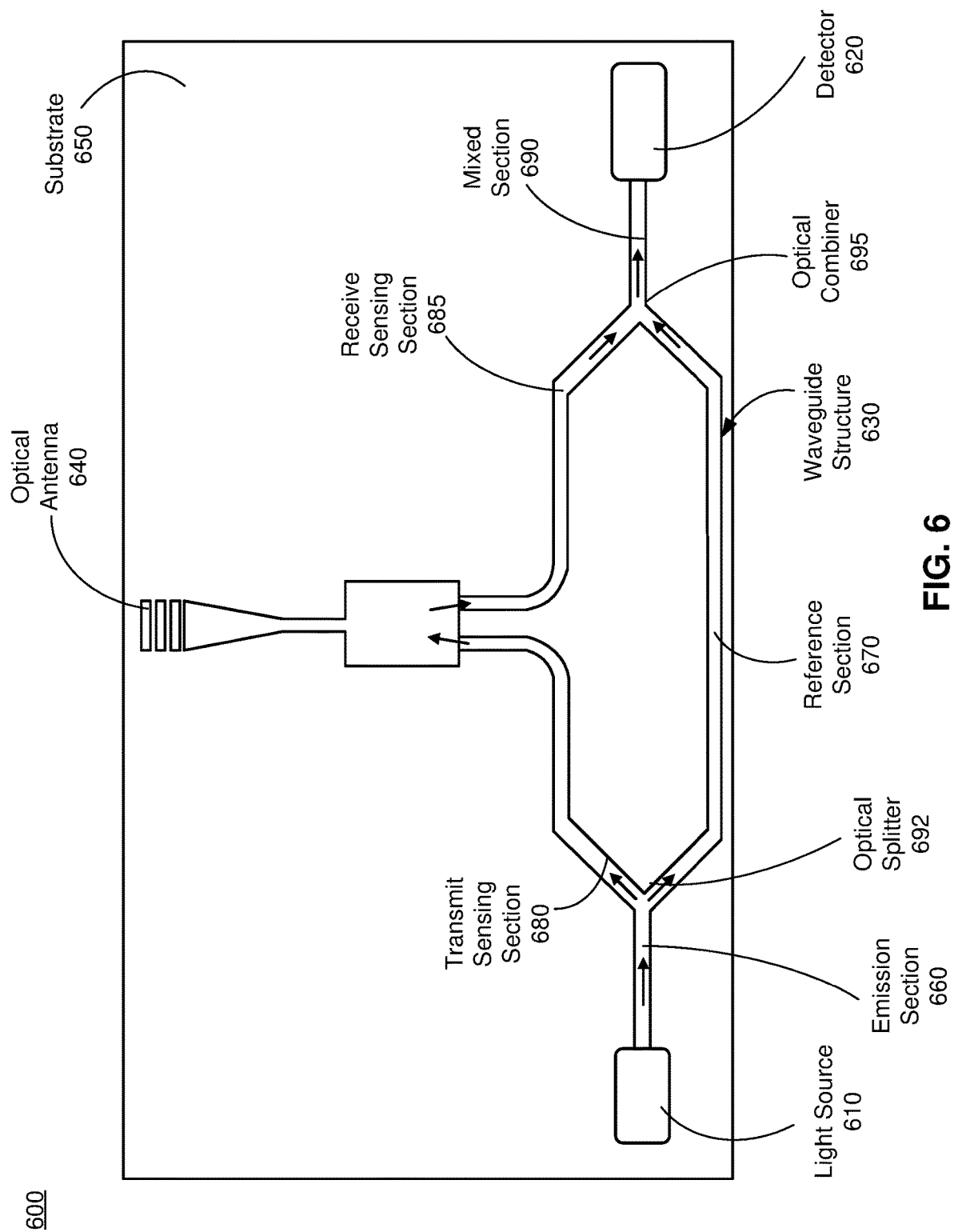
FIG. 6 is an example of an optical microphone that is configured as a laser doppler vibrometer, according to one or more embodiments.

FIG. 6 is an example of an optical microphone 600 that is configured as a LDV, according to one or more embodiments. The optical microphone 600 includes a light source 610 (e.g., edge emitting laser), a detector 620 (e.g., a photodiode), a waveguide structure 630, and an optical antenna 640, that are all on a substrate 650 as part of a photonic integrated circuit. In some embodiments, the optical microphone 600 may include additional components. The optical microphone 600 is an embodiment of the optical microphone 145 that uses a LDV configuration. The optical microphone 600 may, e.g., be embedded in a nose pad of a headset, coupled to a frame of the headset (e.g., in a side fire position), etc.

The waveguide structure 630 is an optical waveguide that guides light to various components of the optical microphone 600. The waveguide structure 630 may couple for example, the light source 610, the optical splitter 692, one or more optical antennae 640, the optical combiner 695, the detector 620, one or more optical amplifiers, or some combination thereof together, via various sections. The sections include an emission section 660, a reference section 670, a transmit sensing section 680, a receive sensing section 685, and a mixed section 690. The waveguide structure also includes an optical splitter 692, an optical combiner 694, and may also include a laser amplifier. The optical splitter 692 splits a portion (e.g., 50%) of light from the emission section 660 into the transmit sensing section 680 and the remaining portion of the light from the emission section 660 into the reference section 670. In some embodiments, a some other portion (e.g., 80%) of the optical power is split into the transmit sensing section 680 than the reference section 670. Likewise, the optical combiner combines light from the received sensing section 685 with light from the reference section 670 into the mixed section 690. The optical microphone 600 may include one or more optical amplifiers that amplify light. For example, it may be positioned to amplify light being prior to being output by the optical antenna 640 and/or amplify light incoupled by the optical antenna 640.

The optical antenna 640 outcouples and incouples light into the optical microphone 600. The optical antenna 640 may be, e.g., a grating coupler. Note that the illustrated embodiment includes a common input/output path of light via the optical antenna 640. In other embodiments (not shown), there may be an optical antenna for outcoupling the sensing beam and a separate optical antenna for receiving the portion of the sensing beam reflected and/or scattered from the skin of the user.

The light source 610 emits light that is coupled into the emission section 660 of the waveguide structure 630. The optical splitter 692 divides the emitted light into a reference beam and a sensing beam, provides the reference beam to the reference section 670, and provides the sensing beam to the transmit sensing section 680. The transmit sensing section 680 provides the sensing beam to the optical antenna 640 which outcouples the light into the local area (e.g., to illuminate the skin of the user). Note that in some embodiments, the light may be amplified using an optical amplifier prior to being emitted by the optical antenna 640. A portion of the sensing beam is reflected and/or scattered by the skin of the user and is incoupled via the optical antenna 640 into the waveguide structure 630. The receive sensing section 685 provides this light to the optical combiner 695. Note that in some embodiments, the light may be amplified using an optical amplifier prior to being passed to the optical combiner 695. The optical combiner 695 combines the received portion of the sensing beam with the reference beam to generate a mixed beam that is incoupled to the mixed section 690. The detector 620 receives the mixed beam and detects a corresponding mixed signal. An audio controller processes the detected mixed signal to measure the sounds from the local area.

The substrate 650 may be formed from any standard chip substrate material, such as a semiconductor material, silicon, silicon-on-insulator, gallium arsenide, aluminum gallium arsenide, silicon on sapphire, etc. The substrate 650 may also be formed from any transparent materials in the visible spectrum band (400 nm to 700 nm), such as glass, plastic, polymer, PMMA, silica, and any forms of crystals (such as lithium niobate, tellurium dioxide, etc.). A surface of the substrate 650 may be bonded to a headset (e.g., the headset 100). Components of the optical microphone 600 may be bonded to the substrate 650 through any standard bonding technique and/or formed on the substrate through any standard etching or epitaxial growth technique.

Figure 7:
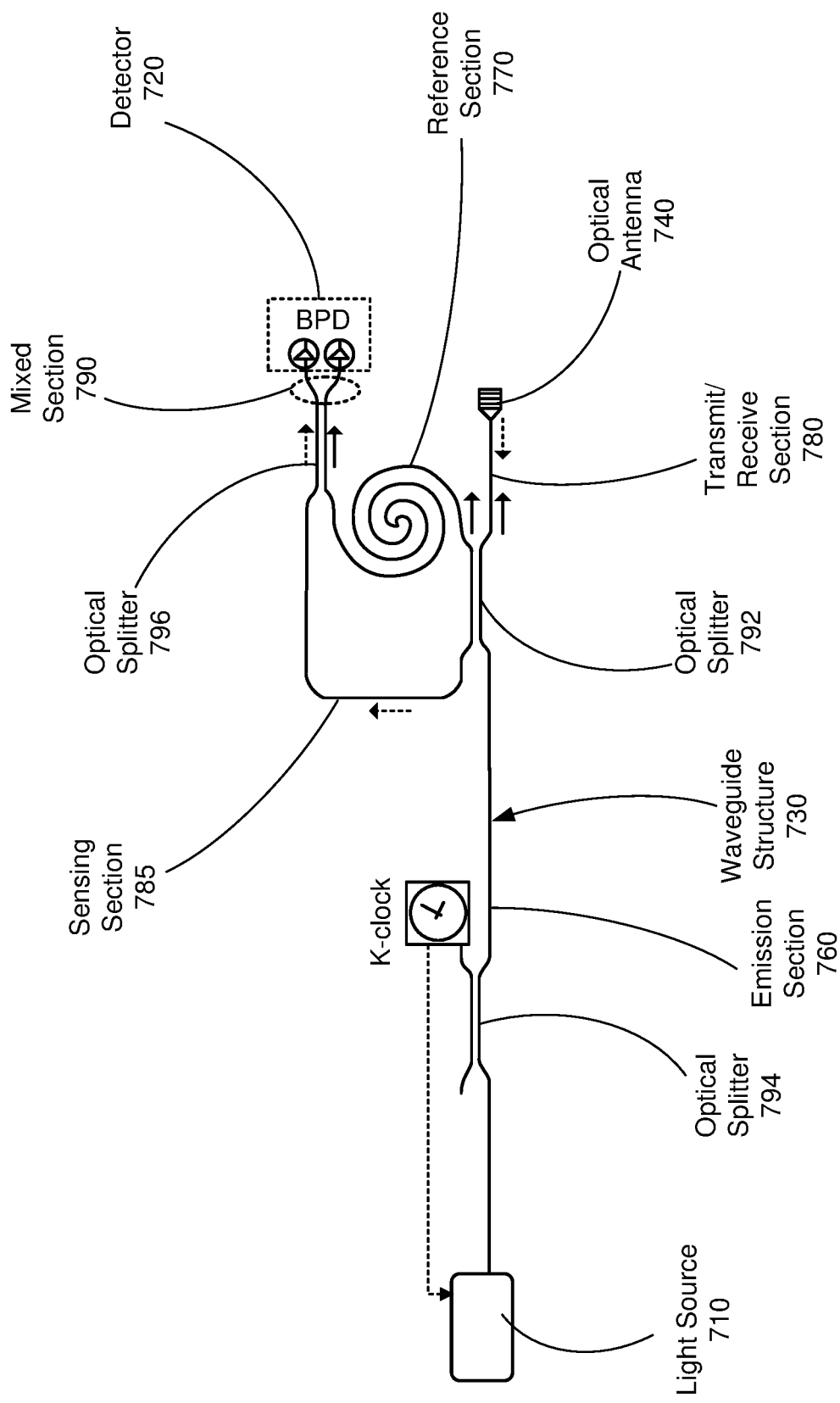
FIG. 7. is an example of an optical microphone that is configured to use optical coherence tomography, according to one or more embodiments.

FIG. 7. is an example of an optical microphone 700 that is configured to use optical coherence tomography (OCT), according to one or more embodiments. OCT is a form of LCI. The optical microphone 700 includes a light source 710, a detector 720, a waveguide structure 730, and the optical antenna 740, that are all part of a photonic integrated circuit. In some embodiments, the optical microphone 700 may include additional components. The optical microphone 700 is an embodiment of the optical microphone 145 that is in an OCT configuration. The optical microphone 700 may, e.g., be embedded in a nose pad of a headset, coupled to a frame of the headset (e.g., in a side fire position), etc. In some embodiments, some or all of the components of the optical microphone 700 may bonded to and/or formed onto a substrate (e.g., the substrate 650).

The waveguide structure 730 is an optical waveguide that guides light to various components of the optical microphone 700. The waveguide structure 730 may couple for example, the light source 710 (e.g., tunable laser source), one or more optical splitters, one or more combiners, one or more optical antennae 740, the detector 720, one or more optical amplifiers, or some combination thereof together via various sections. The sections include an emission section 760, a reference section 770, a transmit/receive section 780, a sensing section 785, and a mixed section 790.

The waveguide structure also includes an optical splitter 792, an optical splitter 794, an optical splitter 796, and may also include a laser amplifier. The optical splitter 794 splits a portion of light from the emission section 760 that is incoupled into a K-clock. The optical splitter 794 splits a portion (e.g., 50%) of light from the emission section 760 into the transmit/receive section 780 and the remaining portion (e.g., remaining 50%) of the light from the emission section 760 into the reference section 770. In some embodiments, some other portion of the optical power is split into the transmit/receive section 780 than the reference section 770. Note that the optical splitter 792 also splits a portion (e.g., 50%) of light travelling in the opposite direction (i.e., light incoupled from the optical antenna 740) from the transmit/receive section 780 into the sensing section 785. The optical splitter 796 combines a first portion (e.g., 50%) of the light from the sensing section 785 and a first portion (e.g., 50%) of the light from the reference section 770 into a first waveguide of the mixed section 790, and combines the remaining portion of the light in both the sensing section 785 and the reference section 770 into a second channel of the mixed section 790. The optical microphone 700 may include one or more optical amplifiers that amplify light. For example, it may be positioned to amplify light being prior to being output by the optical antenna 740 and/or amplify light incoupled by the optical antenna 740.

The light source 710 (e.g., a tunable laser source) emits light that is coupled into the emission section 760 of the waveguide structure 730. The optical splitter 794 splits a portion of light from the emission section 760 that is then incoupled into a K-clock. The K-clock synchronizes the light source 710 so that the output wavelengths are swept linearly, thereby resulting in equal spacing in wavenumber at an analog to digital converter (not shown—but whose functionality may be performed by an audio controller) that processes the mixed signal detected by detector 720 to convert it to a digital signal. The remaining light is transmitted by the emission section 760 to the optical splitter 792. The optical splitter 792 divides the emitted light into a reference beam and a sensing beam, provides the reference beam to the reference section 770, and provides the sensing beam to the transmit/receive section 780. The transmit/receive section 780 guides the sensing beam to the optical antenna 740 which outcouples the light into the local area (e.g., to illuminate the skin of the user). Note that in some embodiments, the light may be amplified using an optical amplifier prior to being emitted by the optical antenna 740.

A portion of the sensing beam is reflected and/or scattered by the skin of the user and is incoupled via the optical antenna 740 into the transmit receive section 780. The transmit/receive section 780 guides the incoupled light to the optical splitter 792. The optical splitter 792 splits a portion of the light into the sensing section 785. The sensing section 785 guides the light to the optical splitter 796. Note that in some embodiments, the light may be amplified using an optical amplifier prior to being passed to the optical splitter 796. The optical splitter 796 combines a first portion (e.g., 50%) of the light from the sensing section 785 and a first portion (e.g., 50%) of the light from the reference section 770 into a first waveguide of the mixed section 790, and combines the remaining portion of the light in both the sensing section 785 and the reference section 770 into a second channel of the mixed section 790. The detector 720 receives the mixed beam and detects a corresponding mixed signal via a pair of balanced photodetectors.

An audio controller processes the detected mixed signal to measure the sounds from the local area. In the OCT configuration, the detected interference pattern (represented as the mixed signal) is a function of wavelength/wavenumber and provides an axial profile of the skin along the beam axis where the fringe frequency corresponds to the depth of the skin and its amplitude corresponds to the reflectance of the skin. Note that there are various forms of OCT, and in other embodiments, the optical microphone 700 may be configured to operate in one of these other forms (e.g., phase-sensitive OCT).

Figure 8:
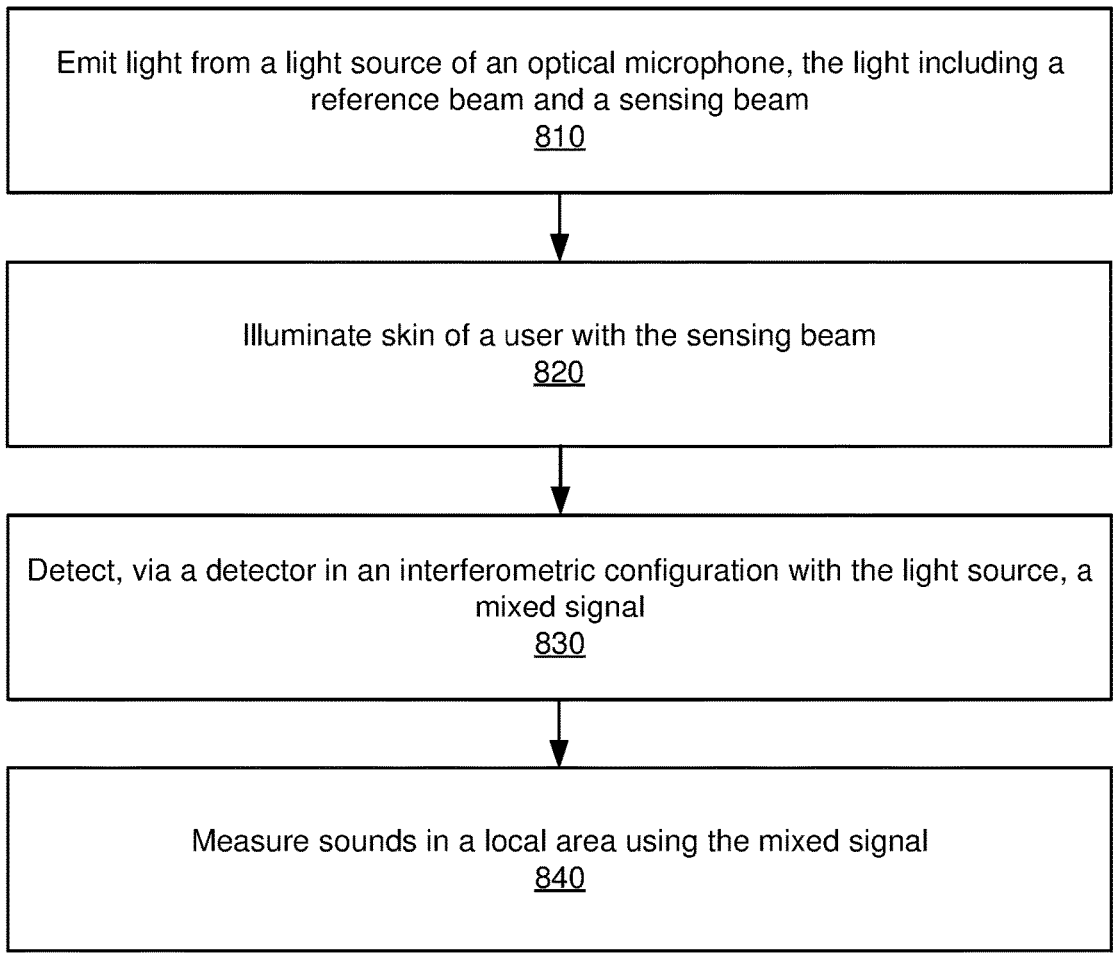
FIG. 8 is a flowchart illustrating a process for using an optical contact transducer in an interferometric configuration, in accordance with one or more embodiments.

FIG. 8 is a flowchart illustrating a process for using an optical contact transducer in an interferometric configuration, in accordance with one or more embodiments. The process shown in FIG. 8 may be performed by components of an audio system (e.g., audio system 200). Other entities may perform some or all of the steps in FIG. 8 in other embodiments. Embodiments may include different and/or additional steps, or perform the steps in different orders.

The audio system emits 810 light from a light source of an optical microphone, the light including a reference beam and a sensing beam. The optical microphone is an embodiment of the optical microphone 145, and may be structured as described above with reference to FIGS. 3, 4, 5A, 5B, and 5C. The optical microphone may be integrated into a headset. The emitted light is continuous wave, and its driving current may be get modulated (e.g., 10 kHz). The optical microphone is positioned to monitor vibrations of skin on a user caused by sounds (e.g., user's voice, other people, noise sources, etc.) in a local area of the audio system.

The audio system illuminates 820 the skin (e.g., one or more different or same portions of the face) of a user with the sensing beam. For example, the sensing beam may be refracted through an optical element of the optical microphone to illuminate the skin of the user.

A portion of the sensing beam scatters and/or reflects from the skin of the user to mix with the reference beam at the detector to form a mixed beam.

The audio system detects 830, via a detector in an interferometric configuration with the light source, a mixed signal (the detected mixed beam). The interferometric configuration is such that the light source and detector form an interferometric system (e.g., self-mixing interferometer, a Michelson interferometer, OCT, LDV, etc.).

The audio system measures 840 the sounds in the local area using the mixed signal. The detected mixed signal includes a dynamic high frequency component and the modulation component. The dynamic high frequency component changes (shifts in frequency) as a function of distance between the illuminated portion of the skin and the detector. Note that the amplitude of vibrations measure may be, e.g., 50 nm (e.g., user whispering) to 1.5 microns (e.g., user yelling). Accordingly, vibrations in the skin caused by sound in the local area result in changes in the dynamic high frequency component. The audio system measures 640 the sound by inferring from the dynamic high frequency component a corresponding sound that would have caused the vibration of the user's skin. Moreover, as the vibrations of the user's skin caused by sound are at much different frequencies than, e.g., vibrations caused by motion of the user (e.g., walking, running), the audio system may isolate and/or filter out portions of the dynamic high frequency component that does correspond to sounds from the local area.

In some embodiments, the measured sounds include a voice of the user, and a high frequency component of the voice is attenuated relative to lower frequencies of the voice. The audio system may reconstruct the high frequency component of the voice via, e.g., matrix-factorization-based bandwidth expansion, a neural-network based audio-super-resolution, etc. The audio system may then update the measured sounds of the voice with the reconstructed high frequency component.

The audio system may perform various actions based in part on sounds measured by the optical microphone. And in embodiments, where the audio system also includes a microphone array, the sounds detected by the microphone array, or some combination thereof. Actions may include, e.g., enhancing a user's voice, using one or more of the optical microphones for voice activity detection (VAD), performing active noise cancelation, etc.

Figure 9:
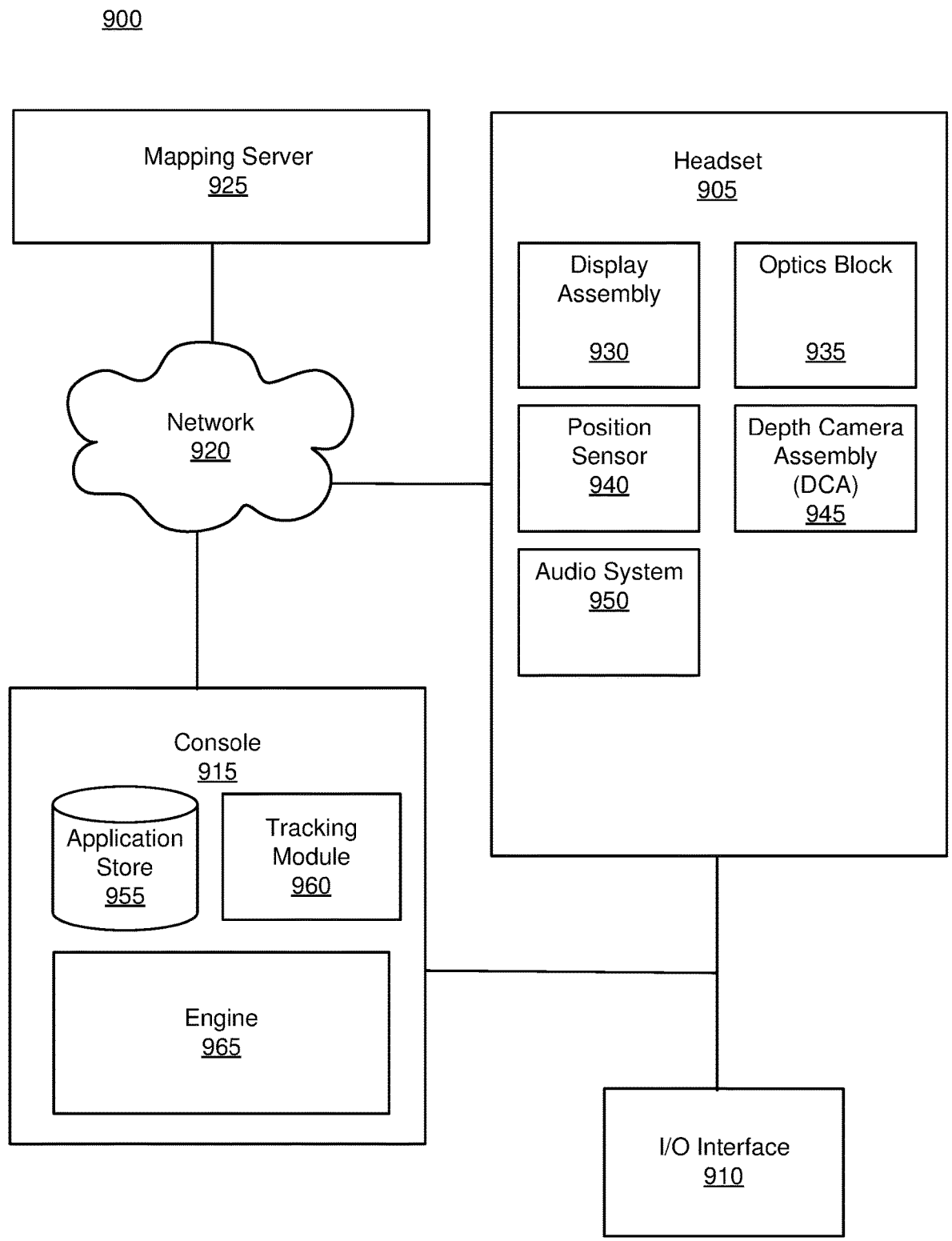
FIG. 9 is a system that includes a headset, in accordance with one or more embodiments.

FIG. 9 is a system 900 that includes a headset 905, in accordance with one or more embodiments. In some embodiments, the headset 905 may be the headset 100 of FIG. 1A or the headset 105 of FIG. 1B. The system 900 may operate in an artificial reality environment (e.g., a virtual reality environment, an augmented reality environment, a mixed reality environment, or some combination thereof). The system 900 shown by FIG. 9 includes the headset 905, an input/output (I/O) interface 910 that is coupled to a console 915, the network 920, and the mapping server 925. While FIG. 9 shows an example system 900 including one headset 905 and one I/O interface 910, in other embodiments any number of these components may be included in the system 900. For example, there may be multiple headsets each having an associated I/O interface 910, with each headset and I/O interface 910 communicating with the console 915. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 915 may be provided by the headset 905.

The headset 905 includes the display assembly 930, an optics block 935, one or more position sensors 990, and the DCA 945. Some embodiments of headset 905 have different components than those described in conjunction with FIG. 9. Additionally, the functionality provided by various components described in conjunction with FIG. 9 may be differently distributed among the components of the headset 905 in other embodiments, or be detected in separate assemblies remote from the headset 905.

The display assembly 930 displays content to the user in accordance with data received from the console 915. The display assembly 930 displays the content using one or more display elements (e.g., the display elements 120). A display element may be, e.g., an electronic display. In various embodiments, the display assembly 930 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 935.

The optics block 935 may magnify image light received from the electronic display, corrects optical errors associated with the image light, and presents the corrected image light to one or both eyeboxes of the headset 905. In various embodiments, the optics block 935 includes one or more optical elements. Example optical elements included in the optics block 935 include: an aperture, a Fresnel lens, a convex lens, a concave lens, a filter, a reflecting surface, or any other suitable optical element that affects image light. Moreover, the optics block 935 may include combinations of different optical elements. In some embodiments, one or more of the optical elements in the optics block 935 may have one or more coatings, such as partially reflective or anti-reflective coatings.

Magnification and focusing of the image light by the optics block 935 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 935 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 935 corrects the distortion when it receives image light from the electronic display generated based on the content.

The position sensor 940 is an electronic device that generates data indicating a position of the headset 905. The position sensor 940 generates one or more measurement signals in response to motion of the headset 905. The position sensor 190 is an embodiment of the position sensor 940. Examples of a position sensor 940 include: one or more IMUs, one or more accelerometers, one or more gyroscopes, one or more magnetometers, another suitable type of sensor that detects motion, or some combination thereof. The position sensor 940 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 905 from the sampled data.

For example, the IMU integrates the measurement signals received from the accelerometers over time to estimate a velocity vector and integrates the velocity vector over time to determine an estimated position of a reference point on the headset 905. The reference point is a point that may be used to describe the position of the headset 905. While the reference point may generally be defined as a point in space, however, in practice the reference point is defined as a point within the headset 905.

The DCA 945 generates depth information for a portion of the local area. The DCA includes one or more imaging devices and a DCA controller. The DCA 945 may also include an illuminator. Operation and structure of the DCA 945 is described above with regard to FIG. 1A.

The audio system 950 provides audio content to a user of the headset 905. The audio system 950 is substantially the same as the audio system 200 describe above. The audio system 950 may comprise one or acoustic sensors (e.g., as part of a sensor array), one or more transducers (e.g., as part of a transducer array), one or more optical microphones, and an audio controller. As described above with regard to, e.g., FIGS. 1-6, output signals from the one or more optical microphones facilitate the audio system 950 performing well in low acoustic SNR environments. In some embodiments, output signals from the one or more optical microphones may be used to, e.g., calibrate the sensor array, used for active noise cancellation, VAD, etc. The audio system 950 may provide spatialized audio content to the user. In some embodiments, the audio system 950 may request acoustic parameters from the mapping server 925 over the network 920. The acoustic parameters describe one or more acoustic properties (e.g., room impulse response, a reverberation time, a reverberation level, etc.) of the local area. The audio system 950 may provide information describing at least a portion of the local area from e.g., the DCA 945 and/or location information for the headset 905 from the position sensor 940. The audio system 950 may generate one or more sound filters using one or more of the acoustic parameters received from the mapping server 925, and use the sound filters to provide audio content to the user.

The I/O interface 910 is a device that allows a user to send action requests and receive responses from the console 915. An action request is a request to perform a particular action. For example, an action request may be an instruction to start or end detect of image or video data, or an instruction to perform a particular action within an application. The I/O interface 910 may include one or more input devices. Example input devices include: a keyboard, a mouse, a game controller, or any other suitable device for receiving action requests and communicating the action requests to the console 915. An action request received by the I/O interface 910 is communicated to the console 915, which performs an action corresponding to the action request. In some embodiments, the I/O interface 910 includes an IMU that detects calibration data indicating an estimated position of the I/O interface 910 relative to an initial position of the I/O interface 910. In some embodiments, the I/O interface 910 may provide haptic feedback to the user in accordance with instructions received from the console 915. For example, haptic feedback is provided when an action request is received, or the console 915 communicates instructions to the I/O interface 910 causing the I/O interface 910 to generate haptic feedback when the console 915 performs an action.

The console 915 provides content to the headset 905 for processing in accordance with information received from one or more of: the DCA 945, the headset 905, and the I/O interface 910. In the example shown in FIG. 9, the console 915 includes an application store 955, a tracking module 960, and an engine 965. Some embodiments of the console 915 have different modules or components than those described in conjunction with FIG. 9. Similarly, the functions further described below may be distributed among components of the console 915 in a different manner than described in conjunction with FIG. 9. In some embodiments, the functionality discussed herein with respect to the console 915 may be implemented in the headset 905, or a remote system.

The application store 955 stores one or more applications for execution by the console 915. An application is a group of instructions, that when executed by a processor, generates content for presentation to the user. Content generated by an application may be in response to inputs received from the user via movement of the headset 905 or the I/O interface 910. Examples of applications include: gaming applications, conferencing applications, video playback applications, or other suitable applications.

The tracking module 960 tracks movements of the headset 905 or of the I/O interface 910 using information from the DCA 945, the one or more position sensors 940, or some combination thereof. For example, the tracking module 960 determines a position of a reference point of the headset 905 in a mapping of a local area based on information from the headset 905. The tracking module 960 may also determine positions of an object or virtual object. Additionally, in some embodiments, the tracking module 960 may use portions of data indicating a position of the headset 905 from the position sensor 940 as well as representations of the local area from the DCA 945 to predict a future location of the headset 905. The tracking module 960 provides the estimated or predicted future position of the headset 905 or the I/O interface 910 to the engine 965.

The engine 965 executes applications and receives position information, acceleration information, velocity information, predicted future positions, or some combination thereof, of the headset 905 from the tracking module 960. Based on the received information, the engine 965 determines content to provide to the headset 905 for presentation to the user. For example, if the received information indicates that the user has looked to the left, the engine 965 generates content for the headset 905 that mirrors the user's movement in a virtual local area or in a local area augmenting the local area with additional content. Additionally, the engine 965 performs an action within an application executing on the console 915 in response to an action request received from the I/O interface 910 and provides feedback to the user that the action was performed. The provided feedback may be visual or audible feedback via the headset 905 or haptic feedback via the I/O interface 910.

The network 920 couples the headset 905 and/or the console 915 to the mapping server 925. The network 920 may include any combination of local area and/or wide area networks using both wireless and/or wired communication systems. For example, the network 920 may include the Internet, as well as mobile telephone networks. In one embodiment, the network 920 uses standard communications technologies and/or protocols. Hence, the network 920 may include links using technologies such as Ethernet, 802.11, worldwide interoperability for microwave access (WiMAX), 2G/3G/9G mobile communications protocols, digital subscriber line (DSL), asynchronous transfer mode (ATM), InfiniBand, PCI Express Advanced Switching, etc. Similarly, the networking protocols used on the network 920 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 920 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 925 may include a database that stores a virtual model describing a plurality of spaces, wherein one location in the virtual model corresponds to a current configuration of a local area of the headset 905. The mapping server 925 receives, from the headset 905 via the network 920, information describing at least a portion of the local area and/or location information for the local area. The user may adjust privacy settings to allow or prevent the headset 905 from transmitting information to the mapping server 925. The mapping server 925 determines, based on the received information and/or location information, a location in the virtual model that is associated with the local area of the headset 905. The mapping server 925 determines (e.g., retrieves) one or more acoustic parameters associated with the local area, based in part on the determined location in the virtual model and any acoustic parameters associated with the determined location. The mapping server 925 may transmit the location of the local area and any values of acoustic parameters associated with the local area to the headset 905.

One or more components of system 900 may contain a privacy module that stores one or more privacy settings for user data elements. The user data elements describe the user or the headset 905. For example, the user data elements may describe a physical characteristic of the user, an action performed by the user, a location of the user of the headset 905, a location of the headset 905, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 900 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio system comprising:
an optical microphone, the optical microphone comprising:
a light source configured to emit light, the light including a reference beam and a sensing beam, the light source configured to illuminate skin of a user with the sensing beam, the sensing beam being directed to a location on the skin that vibrates in response to a voice of the user conducted through tissue; and
a detector in an interferometric configuration with the light source such that the detector is configured to detect a mixed signal, the mixed signal corresponding to the reference beam that is mixed with a portion of the sensing beam that is reflected by the skin, wherein the mixed signal includes (1) a dynamic high frequency component that changes as a function of a distance between the illuminated skin of the user and the detector, and (2) a modulation component;
an audio controller configured to filter out at least a portion of the dynamic high frequency component corresponding to motion noise and measure sounds corresponding to the voice of the user conducted through tissue using the dynamic high frequency component of the mixed signal;
a second optical microphone comprising a second light source and a second detector, and optically isolated from the optical microphone by an optical block; and
an optical element coupled to the optical microphone, the optical block, and the second optical microphone.

2. The audio system of claim 1, wherein the interferometric configuration is such that the light source and the detector form at least one of a self-mixing interferometer, a Michelson interferometer, a low coherence interferometric system, a laser doppler vibrometer, or some other type of interferometric system.

3. The audio system of claim 1, wherein the light source abuts the detector, and the audio system further comprises an optical element configured to:
split the light emitted from the light source into the reference beam and the sensing beam; and
direct the sensing beam towards the skin and direct the reference beam towards the detector.

4. The audio system of claim 1,
wherein the second optical microphone is optically isolated from the optical microphone by the optical block, the second optical microphone comprising:
the second light source configured to emit light, the light including a second reference beam and a second sensing beam, the light source configured to illuminate the skin of the user with the sensing beam, and
a second detector in the interferometric configuration with the second light source such that the second detector is configured to detect a second mixed signal, the second mixed signal corresponding to the second reference beam that is mixed with a portion of the second sensing beam that is reflected by the skin; and
wherein the audio system further comprises the optical element coupled to the optical microphone, the optical block, and the second optical microphone, the optical element configured to:
split the light emitted from the light source into the reference beam and the sensing beam and the light emitted from the second light source into the second reference beam and the second sensing beam,
direct the sensing beam and the second sensing beam to the skin,
redirect the reference beam reflected by the skin towards the detector, and redirect the second reference beam reflected by the skin towards the second detector.

5. The audio system of claim 1, wherein the detector and the light source are separated from each other by a threshold distance.

6. The audio system of claim 1, wherein the optical microphone is on a headset that includes a nose pad, and the optical microphone is integrated into the nose pad and the light source is configured to illuminate the skin of a nose of the user with the sensing beam.

7. The audio system of claim 1, wherein the optical microphone is on a headset that includes a frame, and the optical microphone is integrated into the frame and the light source is configured to illuminate the skin on a face of the user with the sensing beam.

8. The audio system of claim 7, the audio system further comprising a second optical microphone that is integrated into a different location on the frame than the optical microphone, the second optical microphone configured to Illuminate with a second sensing beam a different portion of the skin on the face of the user than the optical microphone.

9. The audio system of claim 1, wherein the optical microphone is on a headset, the audio system further comprising:
a microphone array on the headset, the microphone array configured to detect the sounds from a local area,
wherein the audio controller is further configured to calibrate the optical microphone using the detected sounds.

10. The audio system of claim 1, wherein the optical microphone is on a headset, the audio system further comprising:
a microphone array on the headset, the microphone array configured to detect the sounds from a local area,
wherein the audio controller is further configured to enhance the sounds measured using the mixed signal detected by the detector of the optical microphone based in part on the sounds detected by the microphone array.

11. The audio system of claim 1, wherein the audio controller is further configured to determine an expression of a face of the user based in part on the measured sounds.

12. The audio system of claim 1, wherein the optical microphone is on a headset and the audio controller is further configured to:
  identify noise in the measured sounds; generate a sound filter to suppress the identified noise; and
  apply the sound filter to modify an audio signal that corresponds to audio content, wherein the audio system further comprises
    a transducer array integrated into the headset, the transducer array configured to present the modified audio signal to the user as modified audio content, the modified audio content including the audio content and a suppression component that suppress the noise.

13. The audio system of claim 1, wherein the optical microphone is on a headset, the audio system further comprising:
  a microphone array on the headset, the microphone array configured to detect the sounds from a local area, the sounds from the local area including a voice of the user of the audio system;
  wherein the audio controller is further configured to:
    identify the voice of the user in the detected sounds using the measured sounds; and
    update a sound filter based on the identified voice of the user,
    wherein audio content is modified using the updated sound filter, and the modified audio content is presented by at least one audio system.

14. The audio system of claim 13, wherein the updated sound filter enhances the voice of the user, and the audio controller is further configured to:
  modify the audio content with the updated sound filter, wherein the modified audio content enhances the voice of the user; and
  provide the modified audio content to a second audio system, wherein the second audio system presents the modified audio content.

15. The audio system of claim 13, wherein the updated sound filter enhances the voice of the user, and the audio controller is further configured to:
  modify the audio content with the updated sound filter, wherein the modified audio content enhances the voice of the user;
  determine that the modified audio content includes a command; and
  perform an action in accordance with the command.

16. The audio system of claim 1, further comprising:
  a waveguide structure coupled to the light source and the detector and including an interferometer of the interferometric configuration; and
  a grating coupler coupled to the waveguide structure and configured to (1) transmit the sensing beam from the waveguide structure towards the skin of the user and (2) couple the portion of the sensing beam that is reflected by the skin into the waveguide structure and towards the interferometer of the waveguide structure.

17. The audio system of claim 16, wherein the waveguide structure includes an optical amplifier.

18. The audio system of claim 1, further comprising a vibrational damping structure between the optical microphone and a headset and configured to mitigate an effect on the optical microphone by vibrations from the headset.

19. The audio system of claim 1, wherein the audio controller is further configured to reconstruct high frequency content of the sounds that is attenuated by a body part of the user.

20. An audio system comprising:
  an optical microphone comprising:
    a membrane configured to vibrate in response to a voice of a user conducted through tissue, the membrane being at least partially reflective;
    a light source configured to emit light to illuminate a surface of the membrane, wherein sounds from a local area cause vibrations in at least a portion of skin of the user and the membrane; and
    a detector in an interferometric configuration with the light source and configured to generate a measurement signal corresponding to at least a portion of light reflected by the surface of the membrane;
  an audio controller configured to measure the sounds using the measurement signal;
  a second optical microphone comprising a second light source and a second detector, and optically isolated from the optical microphone by an optical block; and
  an optical element coupled to the optical microphone, the optical block, and the second optical microphone.

* * * * *